(12) United States Patent
Yung (10) Patent No.: US 11,144,031 B2
(45) Date of Patent: Oct. 12, 2021

(54) SYSTEM AND METHOD FOR RELIABLE CONTROLLER

(71) Applicant: Insight Robotics Limited, Hong Kong (CN)

(72) Inventor: Kai Leung Yung, Hong Kong (CN)

(73) Assignee: INSIGHT ROBOTICS LIMITED, Hong Kong (CN)

( * ) Notice: Subject to any disclaimer, the term of this patent is extended or adjusted under 35 U.S.C. 154(b) by 288 days.

(21) Appl. No.: 16/029,646

(22) Filed: Jul. 8, 2018

(65) Prior Publication Data

US 2020/0012258 A1 Jan. 9, 2020

(51) Int. Cl.
G05B 19/4063 (2006.01)

(52) U.S. Cl.
CPC ............... *G05B 19/4063* (2013.01); *G05B 2219/41329* (2013.01); *G05B 2219/42237* (2013.01); *G05B 2219/50193* (2013.01)

(58) Field of Classification Search
CPC ...... G05B 19/4063; G05B 2219/50193; G05B 2219/41329; G05B 2219/42237
See application file for complete search history.

(56) References Cited

U.S. PATENT DOCUMENTS

| 5,309,078 A * | 5/1994 | Cameron | H02P 27/08 318/811 |
|---|---|---|---|
| 6,528,968 B2 * | 3/2003 | Seima | H02P 6/085 318/727 |
| 6,803,679 B1 * | 10/2004 | Luo | H02J 3/44 307/66 |
| 2002/0158600 A1 * | 10/2002 | Seima | H02P 6/085 318/727 |
| 2004/0160201 A1 * | 8/2004 | Rahman | H02P 23/06 318/41 |
| 2005/0073783 A1 * | 4/2005 | Luo | H02M 7/493 361/62 |
| 2019/0013748 A1 * | 1/2019 | Barrenscheen | G06F 1/08 |

* cited by examiner

*Primary Examiner* — Charles R Kasenge
(74) *Attorney, Agent, or Firm* — Eagle IP Limted; Jacqueline C. Lui (57) ABSTRACT

One example embodiment of the present invention is a control system for an actuator that is controlled by a pulse width modulation (PWM) signal. The control system includes at least two controllers that are connected to the actuator. Each of the controller sends an independent sequence of PWM signal to the actuator. The actuator is controlled by a combination of the PWM signals from all the controllers together. The controllers are synchronized by a clock signal that provides a sequence of periodic clock interval and the PWM signal from each controller occupies a separate and non-overlapping clock interval from the PWM signal of other controllers.

16 Claims, 11 Drawing Sheets

SYSTEM AND METHOD FOR RELIABLE CONTROLLER

FIELD OF INVENTION

The present invention relates to the field of controllers for actuators.

BACKGROUND OF INVENTION

In servo driving applications such as drones, unmanned aerial vehicles, electric cars and trains etc., high reliability and failsafe of the actuating system are of prime importance.

New systems and methods that improve the reliability of the actuating system with low operation complexity and high efficiency are highly sought after.

SUMMARY OF INVENTION

One example embodiment of the present invention is a control system for an actuator that is controlled by a pulse width modulation (PWM) signal. The control system includes at least two controllers that are connected to the actuator. Each of the controllers sends an independent sequence of PWM signal to the actuator. The actuator is controlled by a combination of the PWM signals from all the controllers together. The controllers are synchronized by a clock signal that provides a sequence of periodic clock interval. The PWM signal from each controller occupies a separate and non-overlapping clock interval from the PWM signal of other controllers.

One example embodiment is an actuating system with improved reliability. The actuating system includes a direct current (DC) motor, at least two controllers and a sensor. The controllers are connected with the DC motor. Each of the controllers provide an independent sequence of PWM signal to the DC motor to actuate the DC motor. The sensor is coupled to the output of the DC motor and connected to the controllers. The sensor senses a speed of the DC motor and converts the same to an output signal and sends the output signal to the controllers. The controllers are synchronized by a clock signal that provides a sequence of periodic clock interval. The PWM signal from each controller occupies a separate and non-overlapping clock interval from the PWM signal of other controllers. If one or more controller malfunction, the other controllers adjust the duty cycle of the PWM signals based on the output signal of the sensor, so that the speed of the DC motor is not affected by the malfunctioned controllers.

Another example embodiment is a method to improve the reliability of an actuating system. The actuating system includes an actuator and at least two controllers that are coupled to the actuator. The method includes: generating a clock signal with a periodic clock interval to the controller by a clock generator; providing an independent sequence of PWM signal to the actuator by each controller; and actuating the actuator by a combination of the PWM signals from the controllers. The PWM signal from each controller is synchronized by the clock signal and occupies a separate and non-overlapping clock interval from the PWM signal of other controllers. Each controller operates independently from the others to provide redundancy to the actuating system.

Other example embodiments are discussed herein.

DETAILED DESCRIPTION

Example embodiments relate to systems and methods that improve the reliability of the control system for an actuator.

Example embodiments provide direct current (DC) motors as examples of actuators. Example embodiments, however, are not limited to the use of DC motors or a particular type of actuators. Various type of actuators that are controlled by pulse width modulation (PWM) signals can be executed in an example embodiment. Further, example embodiments may be executed in any applications that require a reliable control system for the actuator, such as drones, unmanned aerial vehicles, electric cars, electric trains, unmanned maritime vehicles, terrestrial robots, space robots etc.

Various solutions have been offered by the art to improve the reliability of the actuating system, and the actuator and/or controller in particular. A common strategy is to supply redundant duplicates of critical components within the actuator, while the actuating system is capable of functioning without all the components. Even full sets of the actuating systems are supplied as redundancies while only one set of the actuating system is functioning at any given time.

The main drawbacks of the conventional approaches are as follows: 1) increased complexity in operating redundant components simultaneously; 2) low efficiency of resource allocation because of the extra components that are not in use; and 3) reduction of system performance caused by the additional weight of the redundant components imposed on the actuating system, which is especially prominent in the application of the unmanned aerial vehicle such as drones. Besides, there are situations that a complete redundant actuating system is impossible to install due to mechanical constraints.

It is observed that the actuator is usually much more reliable than the controller. Instead of supplying one or more redundant actuators, example embodiments employ only one actuator but incorporate more than one controllers in the control system. The controllers are synchronized by a clock signal to provide control signals to the actuator simultaneously and the actuator is driven by a sum of the control signals. Each controller serves as a redundancy for the other controllers. When one of the controllers fails, the other controller(s) will continue to provide control signal(s) for the actuator to keep it working.

The example embodiments provide a "hot" backup of the controllers. That is, the actuating system requires no downtime to switch between the controllers in case of malfunction of one controller. As all the controllers send out the control signals at the same time, the actuator will continue to work unless all the controllers fail, which occurs with low probability. Since the weight of a controller is much less than that of an actuator in general, the reliability of the actuating system as a whole is greatly improved without adding too much weight therein.

Example embodiments further include a sensor/encoder to measure the output of the actuator and feedback the sensor output to the controllers. The controllers can then adjust the pulse width of the control signals according to the feedback and thus keep the output of the actuator stable.

By way of example, if one of the controllers fails and shuts down, the combined control signals driving the actuator will be reduced, resulting in a decrease of the output of the actuator such as the speed, torque, or power. The decrease is sensed by the sensor and fed back to the working controllers. The working controllers can then increase their control signal output, for example, by increasing the duty cycle of the control signals to compensate for the power loss that is caused by the failure of the controller. As a result, the output of the actuator remains stable.

The example embodiments provide control systems with compact size and light weight that are efficient, flexible, and easy to implement for the actuating system, which improve the reliability of the actuating system without burdening it, and thus solve the technical problems associated with the conventional redundancies for the actuating system.

In one example embodiment, the control system includes at least two controllers that are connected to the actuator. Each of the controller sends an independent sequence of PWM signal to the actuator. The actuator is controlled by a combination of the PWM signals from all the controllers together. The controllers are synchronized by a clock signal that provides a sequence of periodic clock interval and the PWM signal from each controller occupies a separate and non-overlapping clock interval from the PWM signal of other controllers.

By way of example, all the controllers are identical in function and characteristics. They are configured to generate their own PWM signals that do not collide with each other as mentioned above.

By way of example, the clock signal can be generated by one of the controllers or by a clock generator.

By way of example, the control system further includes a sensor. The sensor is coupled to the actuator to measure a parameter of the actuator. The parameter of the actuator can be one of speed, position, torque or power. The sensor further converts the parameter to an output signal. The output signal is sent to the controllers to adjust the PWM signal of the controller.

In one example embodiment, an actuating system includes a DC motor and at least two controllers that are connected with the DC motor. Each of the controllers provide an independent sequence of PWM signal to the DC motor to actuate the DC motor. A sensor is coupled to the output of the DC motor and connected to the controllers. The sensor senses a speed of the DC motor and converts the same to an electrical output signal and sends the electrical output signal to the controllers. The controllers are synchronized by a clock signal that provides a sequence of periodic clock interval. The PWM signal from each controller occupies a separate and non-overlapping clock interval from the PWM signal of other controllers. If one or more controller malfunction, the other controllers adjust the duty cycle of the PWM signals based on the electrical output signal of the sensor, so that the speed of the DC motor is not affected by the malfunctioned controllers.

By way of example, the actuating system further includes an H-bridge that is connected between the controllers and the DC motor to reverse direction of the DC motor.

By way of example, the actuating system includes two controllers. One controller uses a leading edge of the clock signal to trigger the generation of the PWM signal and the other controller uses a falling edge of the clock signal to trigger the generation of the PWM signal.

Figure 1:
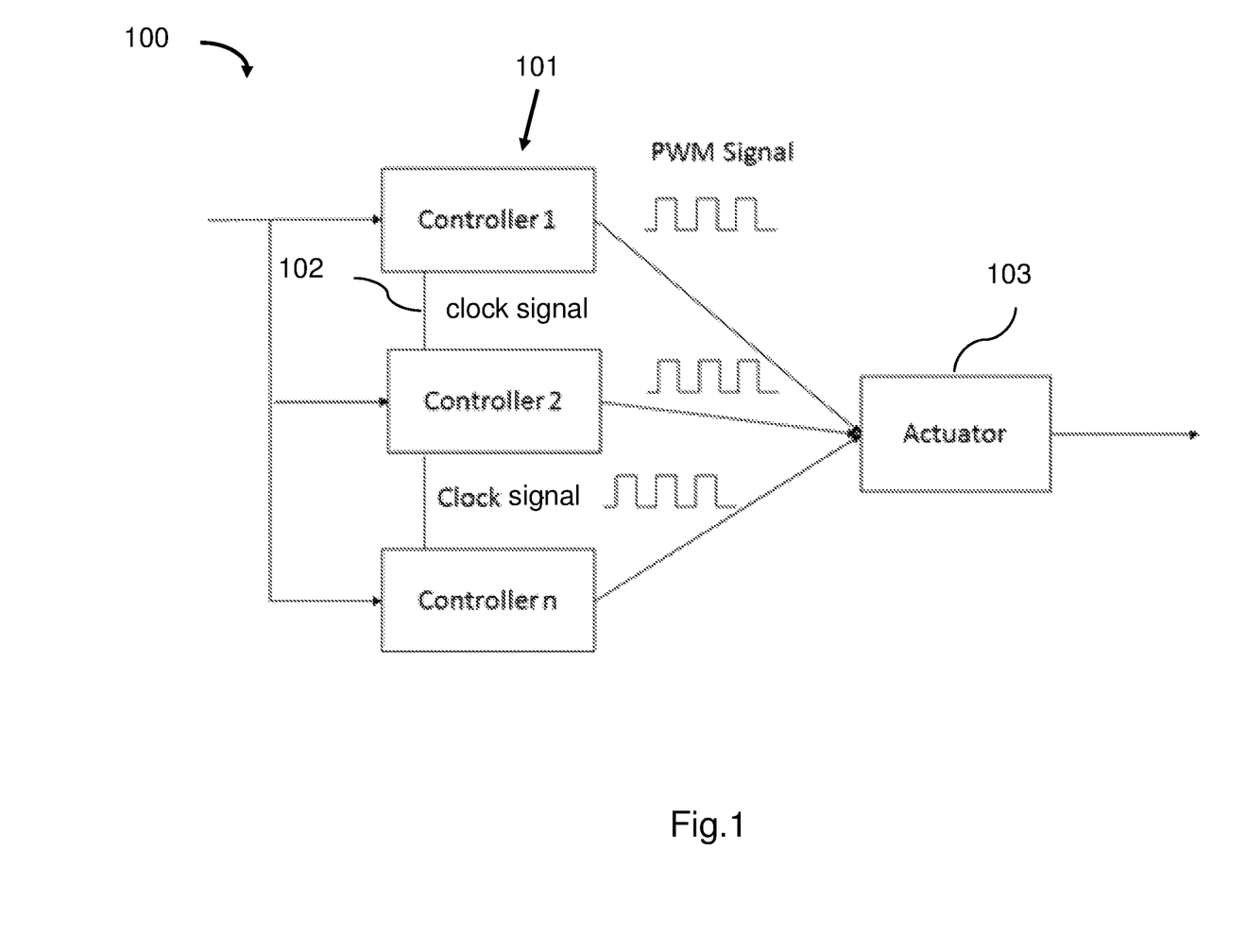
FIG. 1 is a schematic illustration of an actuating system in accordance with an example embodiment.

FIG. 1 is a schematic illustration of an actuating system 100 in accordance with an example embodiment.

Referring to FIG. 1, the actuating system 100 includes n (n>1) controllers 101, i.e., controller 1 to controller n, and an actuator 103. The controllers 101 are connected with the actuator 103. The controllers 101 are synchronized by a clock signal 102. The clock signal 102 is generated by one of the controllers 101. Each of the controllers 101 provides PWM signals to the actuator 103 simultaneously.

In the actuating system 100, each controller 101 sends an independent sequence of PWM signal to the actuator 103. The clock signal 102 provides a sequence of periodic clock interval and the PWM signal from each controller occupies a separate and non-overlapping clock interval from the PWM signal of other controllers. The PWM signals from all the controllers 101 are combined at the input of the actuator 103 to drive the actuator 103.

By way of example, a control cycle is defined as a time period that occupies n clock intervals, where n is the number of controllers. Each controller 101 provides one pulse in one control cycle. For example, the first controller sends a PWM signal at the first clock interval at the beginning of the control cycle. The second controller sends the PWM signal at the second clock interval, and the nth controller sends its PWM signal at the nth clock interval. The PWM signals from all the controllers 101 are combined at the input of the actuator 103 and the combined PWM signal drives the actuator 103.

In the actuating system 100, if one controller malfunctions, the other controllers will continue to provide PWM signals to the actuator 103 and keep the actuating system working. If the controller that generates the clock signal 102 malfunctions, one of the other working controllers will take over to generate the clock signal 102 to synchronize all the working controllers. Each of the controllers 101 serves as a "hot" backup for the other controllers.

Figure 2:
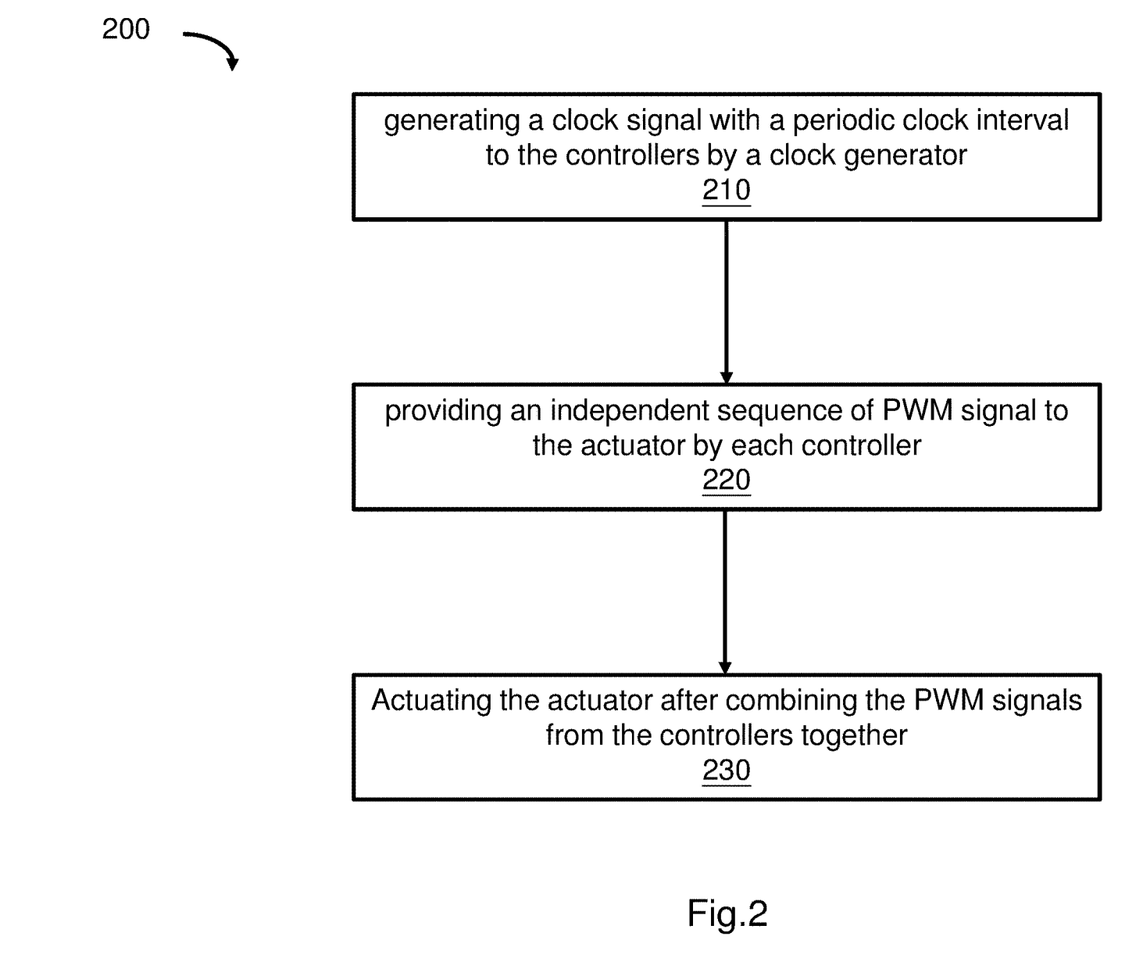
FIG. 2 is a flowchart of a control method in accordance with an example embodiment.

FIG. 2 is a flowchart 200 of a control method in accordance with an example embodiment.

In FIG. 2, the block 210 states generating a clock signal with a periodic clock interval to the controllers by a clock generator.

In one example embodiment, the clock signal is generated by one of the controllers. In another example embodiment, a separate clock generator generates the clock signal to synchronize all the controllers.

Block 220 states providing an independent sequence of PWM signal to the actuator by each controller.

By way of example, all the controllers provide the independent PWM signals to the actuator simultaneously to control the actuator. The PWM signal from each controller is synchronized by the clock signal and occupies a separate and non-overlapping clock interval from the PWM signal of other controllers.

Block 230 states actuating the actuator after combining the PWM signals from the controllers together.

By way of example, the independent PWM signals are combined and provided to the actuator. Each controller operates independently from the others so that each controller serves as a redundancy for the other controllers in the actuating system.

Figure 3:
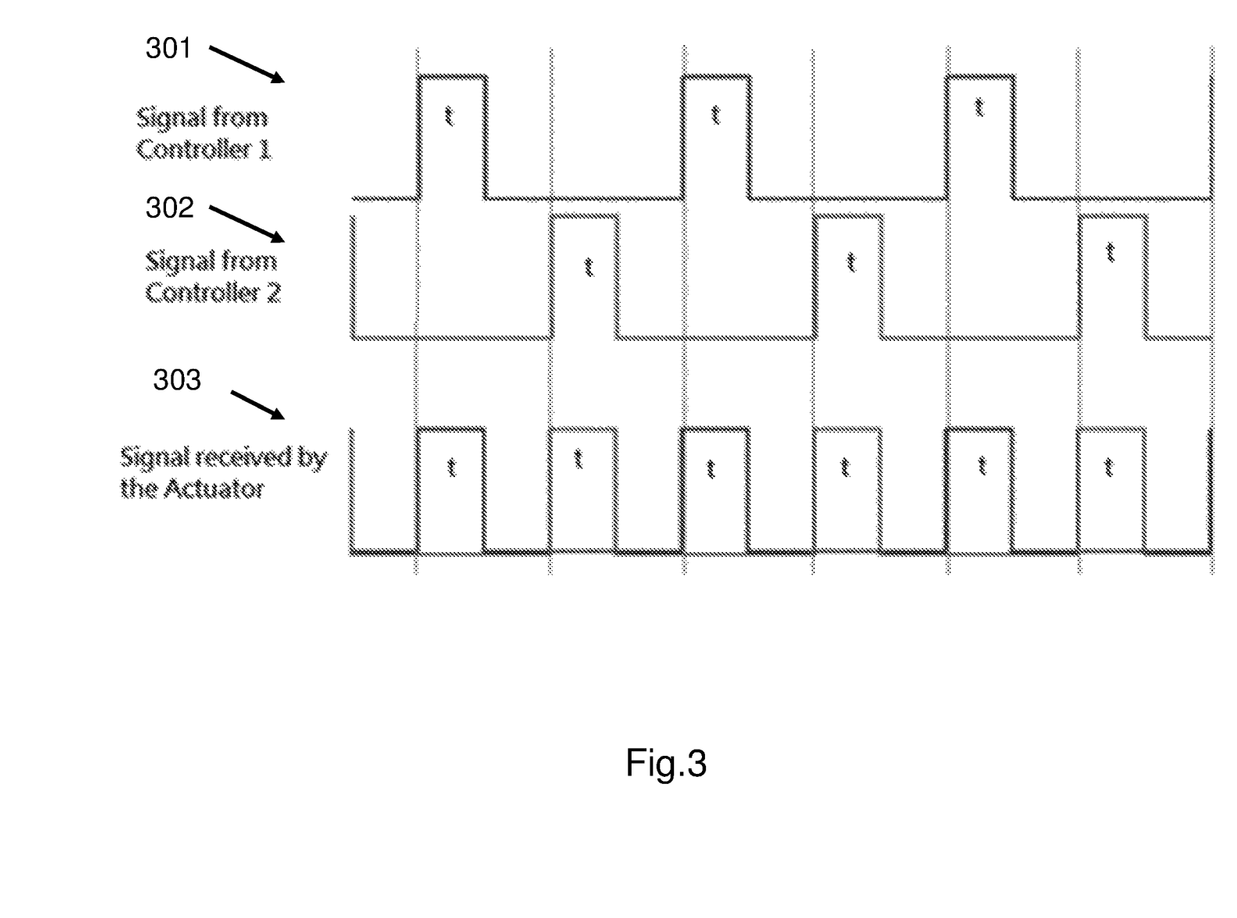
FIG. 3 shows control signals from a control system with two controllers in accordance with an example embodiment.

FIG. 3 shows control signals from a control system with two controllers in accordance with an example embodiment.

By way of example, the control system includes two controllers. Each controller provides half of the power received by the actuator. As shown in FIG. 3, signal 301 is the PWM signal generated from one controller. Signal 302 is the PWM signal generated from the other controller. Both the signal 301 and the signal 302 have a duty cycle of 25% and there is a phase difference of 180° therebetween. By combining the signal 301 and signal 302, the signal 303, which is a PWM signal with a duty cycle of 50%, is obtained and provided to the actuator.

Figure 4:
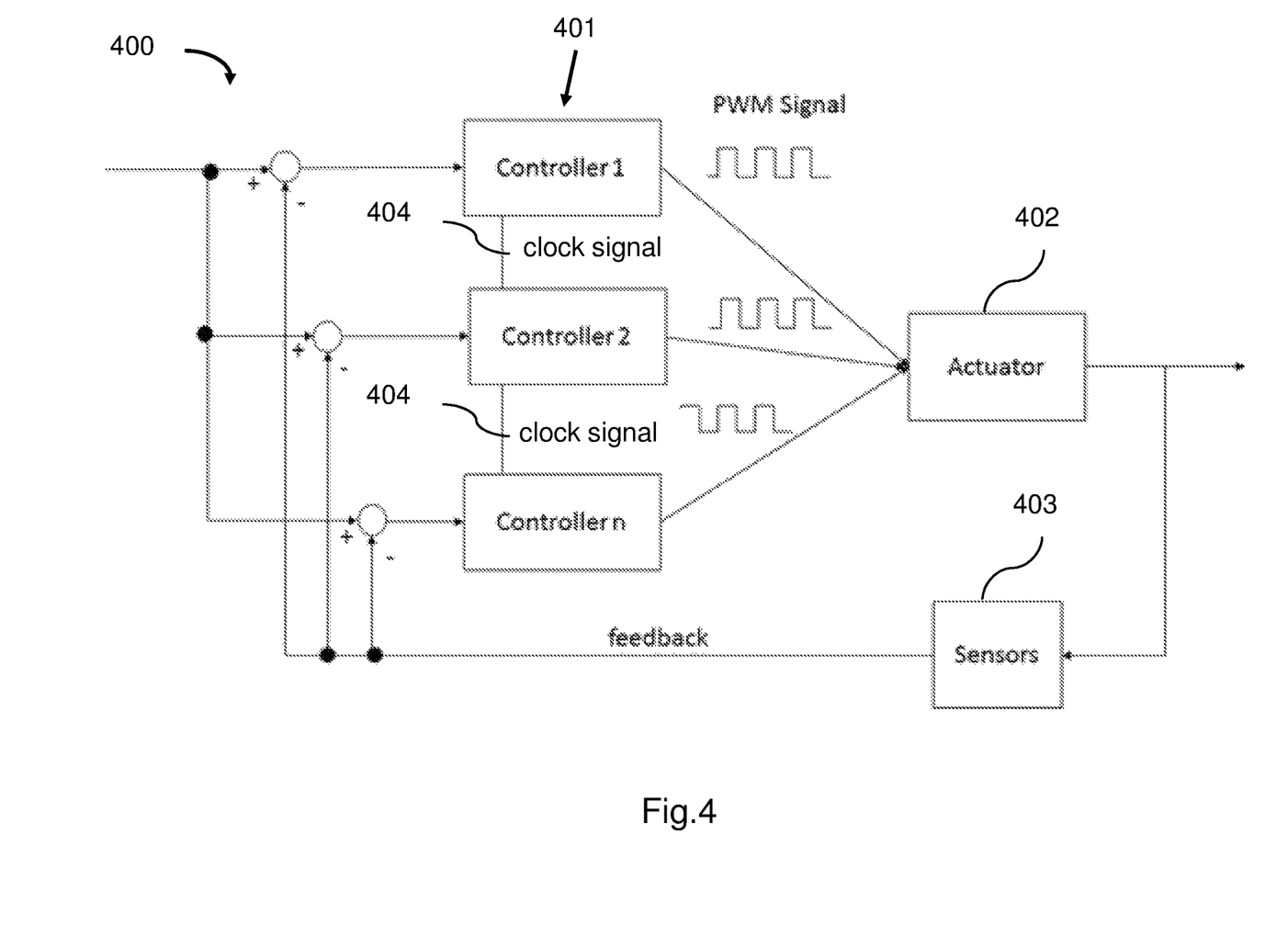
FIG. 4 is a schematic illustration of an actuating system with feedback in accordance with an example embodiment.

FIG. 4 is a schematic illustration of an actuating system 400 with feedback in accordance with an example embodiment.

In FIG. 4, the actuating system 400 includes n controllers 401, an actuator 402 and sensor 403. The controllers 401 are synchronized by a clock signal 404 that provides a sequence of periodic clock interval. The controllers 401 are connected to the actuator 402 to provide PWM signals to the actuator 402. The sensor 403 is coupled to the actuator 402 to measure the output of the actuator 402, convert the output of the actuator 402 into a signal and feedback the signal to each of the controllers 401. The sensor 403 includes but not limit to speed sensor, torque sensor, rotary encoder, position sensor and power sensor.

By way of example, the controllers 401 are all identical, and each controller 401 provides a sequence of PWM signal that supplies 1/n portion of the power received by the actuator 402. For example, the PWM signal from each controller occupies a separate and non-overlapping clock interval from the PWM signal of other controllers. The combination of the n sequences of PWM signal forms the final PWM signal provided for the actuator 402.

When m (1<=m<n) controllers in the actuating system 400 fail and shut down, the actuator 402 will receive only (n−m)/n of the target power and thus the output of the actuator 402 decreases. The decrease of the output is sensed by the sensor 403 and fed back to the controllers 401. Since all the controllers 401 receive the same feedback from the sensor, the remaining n-m working controllers will increase the power output at the same time to 1/(n−m) of the target power to compensate for the m malfunctioned controllers. For example, each working controller 401 provides one pulse of the PWM signal in one control cycle in sequence and starts over, while the control cycle is shortened to be (n−m)/n of the original control cycle with n controllers.

Figure 5:
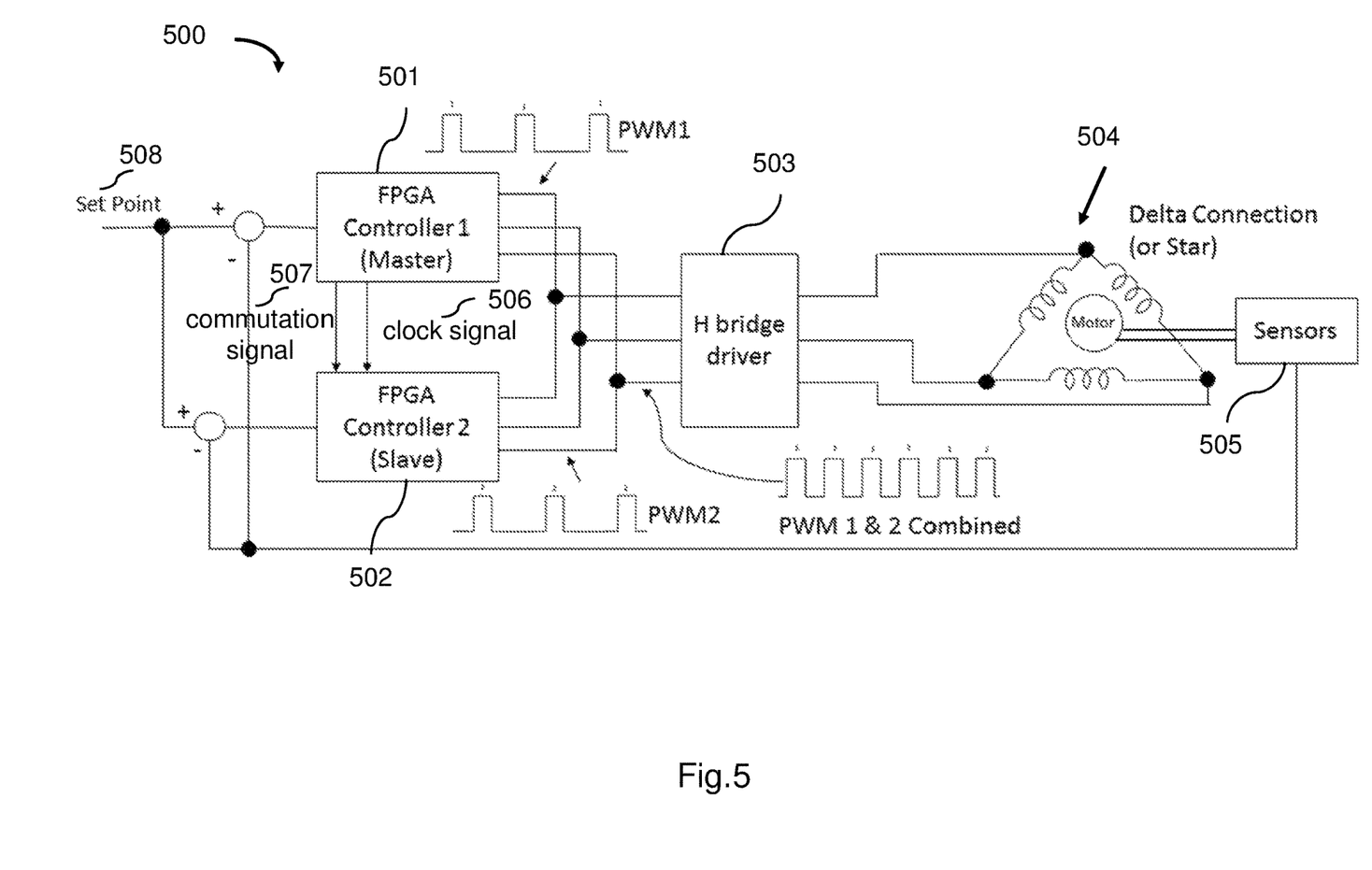
FIG. 5 shows a schematic illustration of an actuating system with a brushless direct current (BLDC) motor in accordance with an example embodiment.

FIG. 5 shows a schematic illustration of an actuating system 500 for a brushless direct current (BLDC) motor in accordance with an example embodiment.

In FIG. 5, the actuating system 500 includes a master controller 501 and a slave controller 502, an H-bridge 503 and sensors 505. Both the master controller 501 and the slave controller 502 are Field Programming Gate Array (FPGA) controllers. The master controller 501 and the slave controller 502 are connected in parallel and synchronized by a clock signal 506. The H-bridge 503 is connected between the controllers 501, 502 and the BLDC motor 504 to provide control signals thereto. The sensors 505 are coupled to the BLDC motor 504 and the output signal of the sensors is connected with the controllers 501 and 502 respectively. The BLDC motor 504 has one set of coils in Delta connection.

By way of example, the clock signal 506 is generated by the master controller 501. The master controller 501 uses the leading edge of the clock signal 506 to trigger the PWM signal. The slave controller 502 uses the falling edge of the clock signal 506 to trigger the PWM signal. Thus, the two controllers provide pulses of the PWM signal in an alternating way. The PWM signals generated by the two controllers 501 and 502 are combined before the H-bridge 503 and provided to the BLDC motor 504 after the H-bridge 503.

The master controller 501 also generates a commutation signal 507 according to the calculation result of the set point 508 and the feedback from the sensors 505. The commutation signal 507 is fed to the slave controller 502 to ensure the slave controller 502 follows the exact commutation of the master controller 501.

In case that the slave controller 502 fails, the master controller 501 will continue to provide the PWM signal to the BLDC motor 504. Since the power received by the BLDC motor 504 is halved, the sensors 505 will detect a decreased speed of the BLDC motor 504. The sensed signal is fed back to the master controller 501 and the master controller 501 will increase the duty cycle of the output PWM signal to restore the speed of the BLDC motor 504.

In case that the master controller 501 fails and hence there is no clock signal or commutation signal, then the slave controller 502 will take over to generate the clock signal 506 to trigger the PWM pulses as well as its own commutation signal 507.

Figure 6:
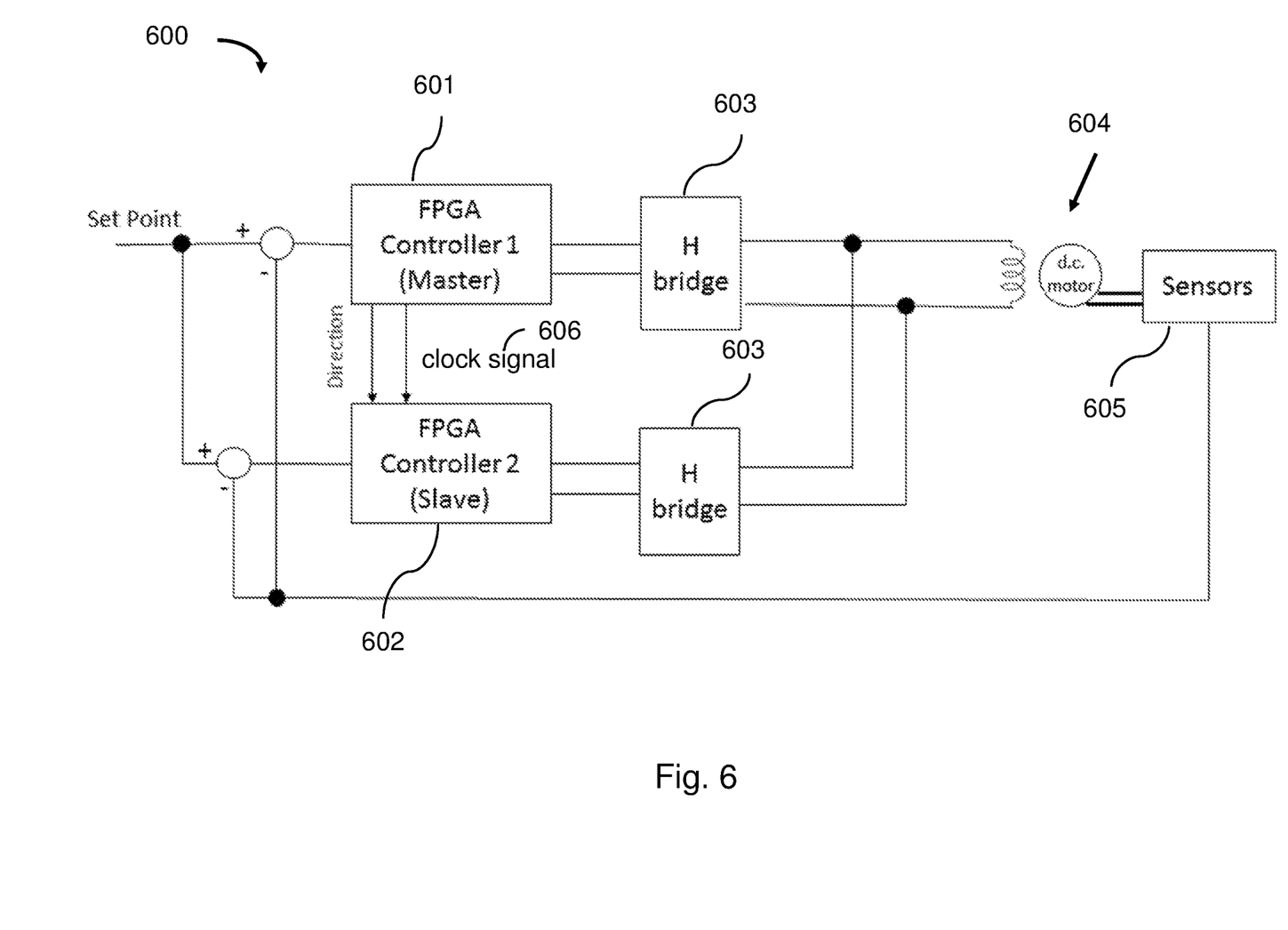
FIG. 6 shows a schematic illustration of an actuating system with a brushed direct current (DC) motor in accordance with an example embodiment.

FIG. 6 shows an actuating system 600 with a brushed direct current (DC) motor in accordance with an example embodiment.

As shown in FIG. 6, the actuating system 600 includes a master controller 601, a slave controller 602, two H-bridges 603, sensors 605 and a brushed DC motor 604. The master controller 601 and the slave controller 602 are connected in parallel and synchronized by a clock signal 606. The two H-bridges 603 are connected with the master controller 601 and slaver controller 602 respectively. The two H-bridges 603 are further connected to the motor 604 to provide the PWM signal thereto. The sensors 605 are coupled with the DC motor and are connected to the controllers 601 and 602 respectively.

By way of example, the controllers 601 and 602 are FPGA controllers. The master controller 601 generates the clock signal 606 to synchronize the slave controller 602. The master controller 601 uses the leading edge of the clock signal 606 to trigger the PWM signal. The slave controller 602 uses the falling edge of the clock signal 606 to trigger the PWM signal. Thus, the two controllers provide pulses of the PWM signal in an alternating way. The PWM signals generated by the two controllers 601 and 602 are combined after the H-bridges 603 and provided to the DC motor 604.

The master controller 601 also generates a direction signal according to the calculation result of a set point and the sensor feedback. The direction signal is fed to the slave controller 602 to synchronize it with the master controller 601 such that the PWM pulses from the H-bridges 603 have a correct positive/negative voltage for forward and reverse rotation of the motor accordingly. If the master controller 601 fails and is unable to provide the direction signal and the clock signal, the slave controller 602 will take on the master role and generate the signals itself.

The example embodiment in FIG. 6 works similarly to the example embodiment in FIG. 5 except for the commutation signal and the direction signal. If the master controller 601 fails, the slave controller 602 will take over to generate its own clock signal and continue to provide PWM signals to the DC motor. In the situation that one of the controllers fails, the power for driving the DC motor 604 decreases, resulting in a decrease of the output of the DC motor 604, such as the speed. The sensors 605 senses the output of the DC motor and sends the same to the working controller. The working controller then doubles the duty cycle of the PWM signal to increase the power output and thus restore the output of the DC motor 604.

In the example embodiment, each controller works independently and serves as a redundancy for the other controller. The actuating system need not to be shut down to change the controller in case of malfunction of one of the controllers. Neither will the actuating system fail due to the failure of one controller. Hence, the reliability of the actuating system is much improved. Further, with the sensor feedback, the working controllers can adjust the power provided to the actuator automatically and thus keep the speed of the motor stable.

Figure 7:
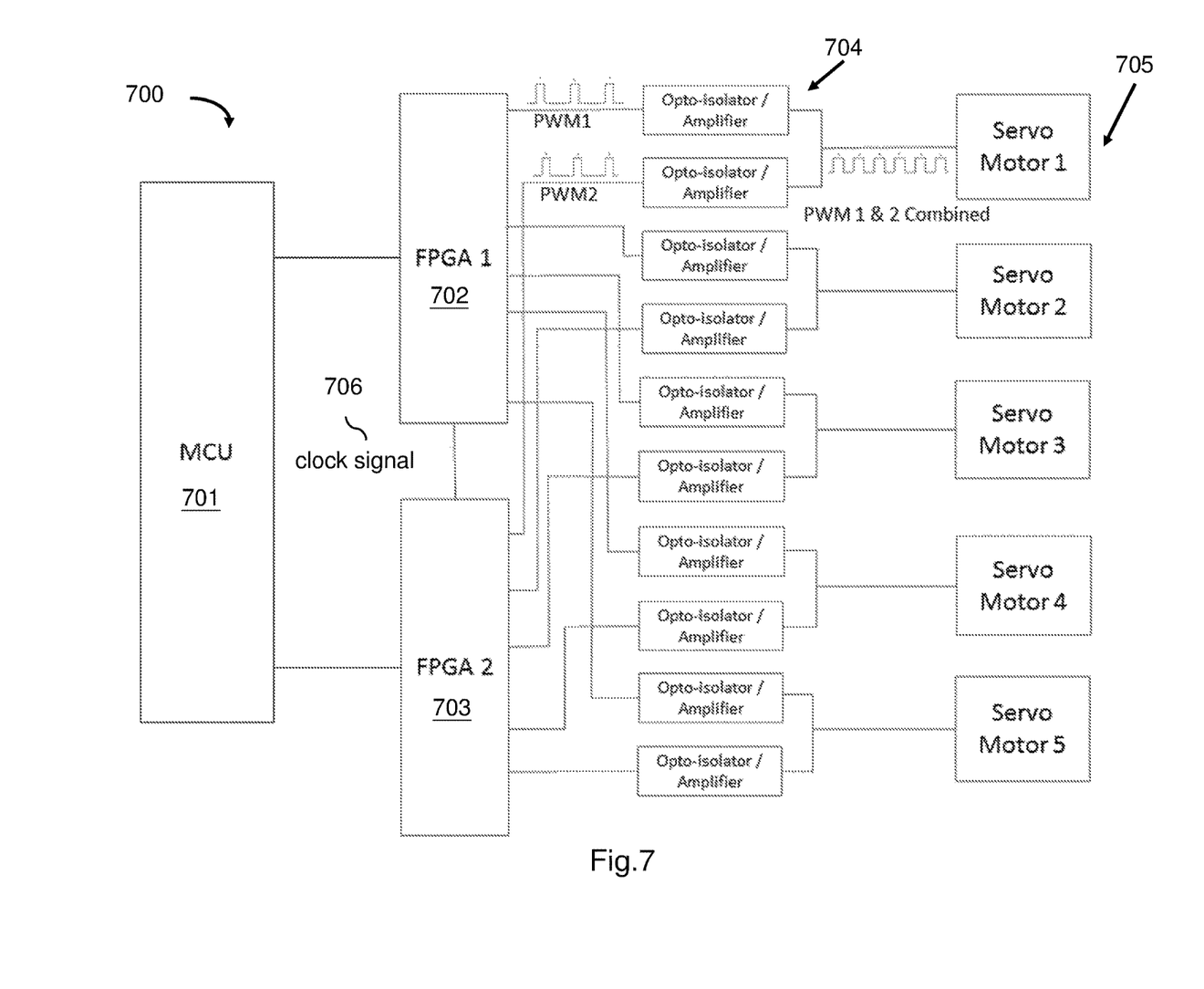
FIG. 7 shows a schematic illustration of an actuating system with multiple servo motors in accordance with an example embodiment.

FIG. 7 shows an actuating system 700 with multiple servo motors in accordance with an example embodiment;

In FIG. 7, the actuating system 700 includes a microcontroller (MCU) 701, two FPGA controllers 702 and 703 that are connected with the microcontroller 701 and synchronized by a clock signal 706, 5 pairs of opto-isolator/amplifiers 704 for input/output isolation that are connected with 5 servo motors 705. The two opto-isolator/amplifiers in each pair of opto-isolator/amplifiers 704 are connected with the FPGA controller 702 and 703 respectively.

By way of example, the clock signal 706 is generated by the microcontroller 701 to synchronize the FPGA controllers 702 and 703. Each FPGA controller 702/703 provides one sequence of PWM signals to each pair of opto-isolator/amplifiers 704. The two sequences of PWM signals from each pair of opto-isolator/amplifiers 704 are combined and provided to one servo motor 705 as the control signal. For example, each FPGA controller provides half of the combined power to each servo motor 705, and each FPGA controller works as a redundancy of the other FPGA controller to improve the reliability of the control system 700.

Figure 8A:
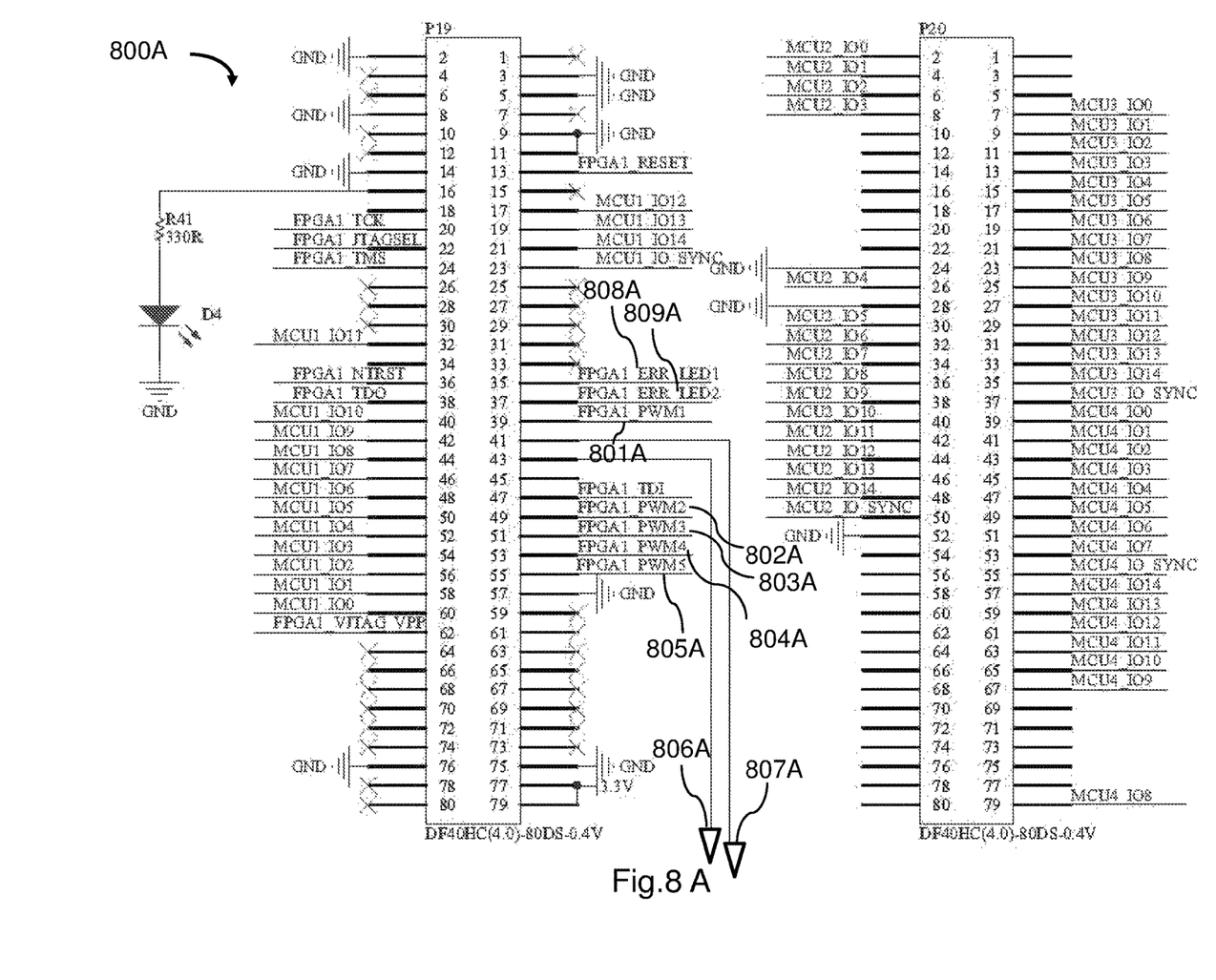
FIG. 8A shows a schematic illustration of a first part of a control system in accordance with an example embodiment.
Figure 8B:
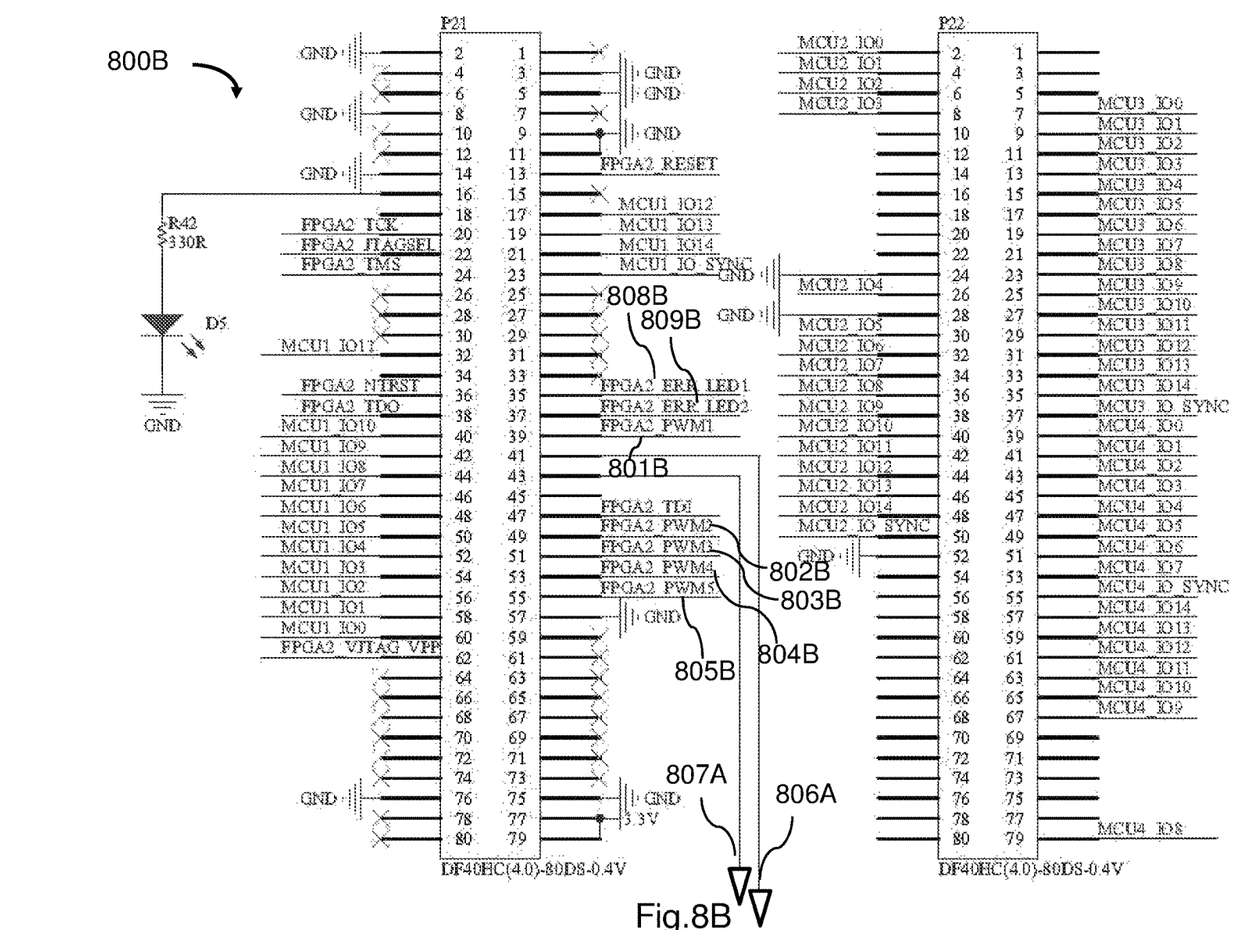
FIG. 8B shows a schematic illustration of a second part of the control system in accordance with the example embodiment in FIG. 8A.
Figure 8C:
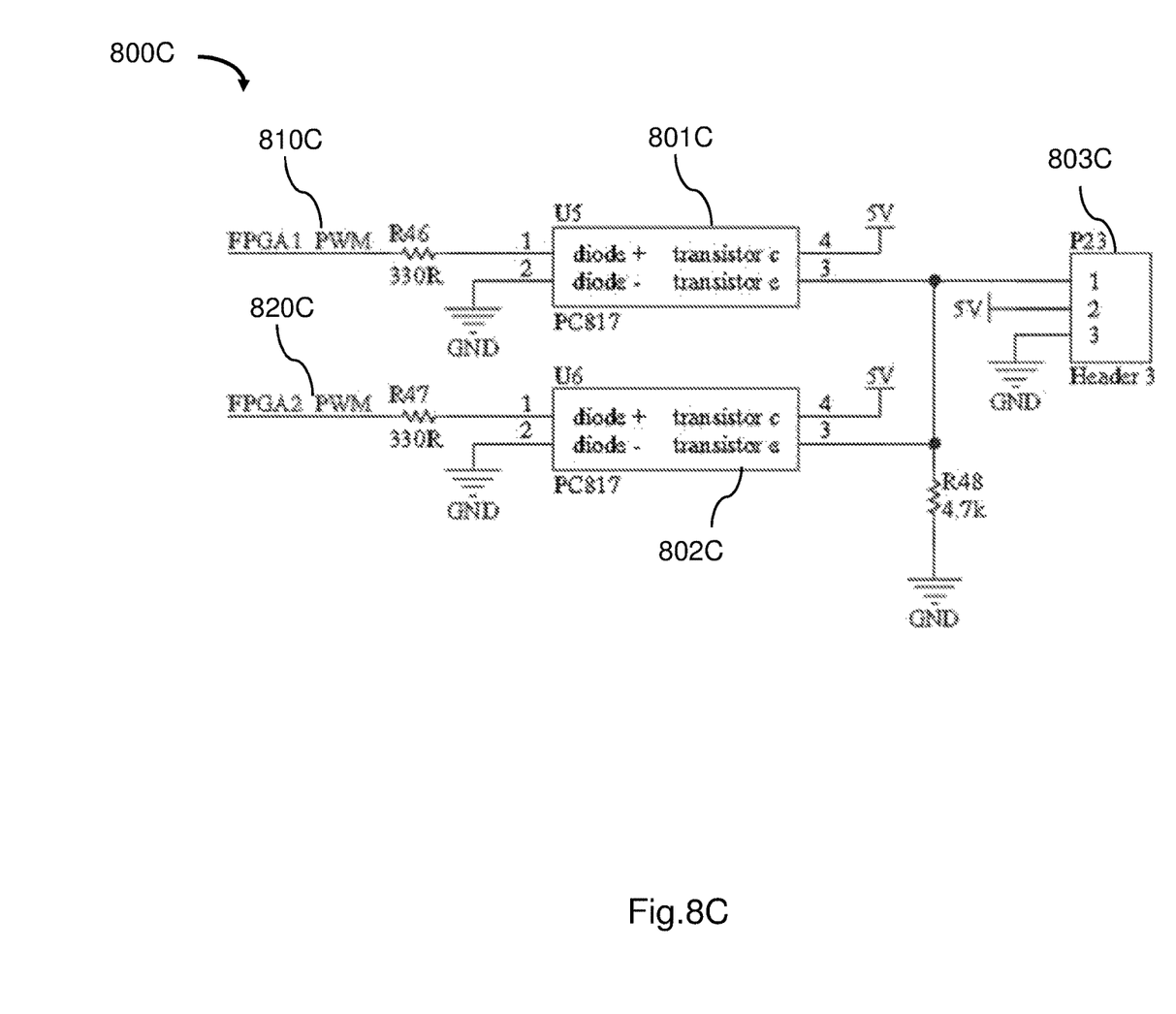
FIG. 8C shows a schematic illustration of a third part of the control system in accordance with the example embodiment in FIG. 8A.
Figure 8D:
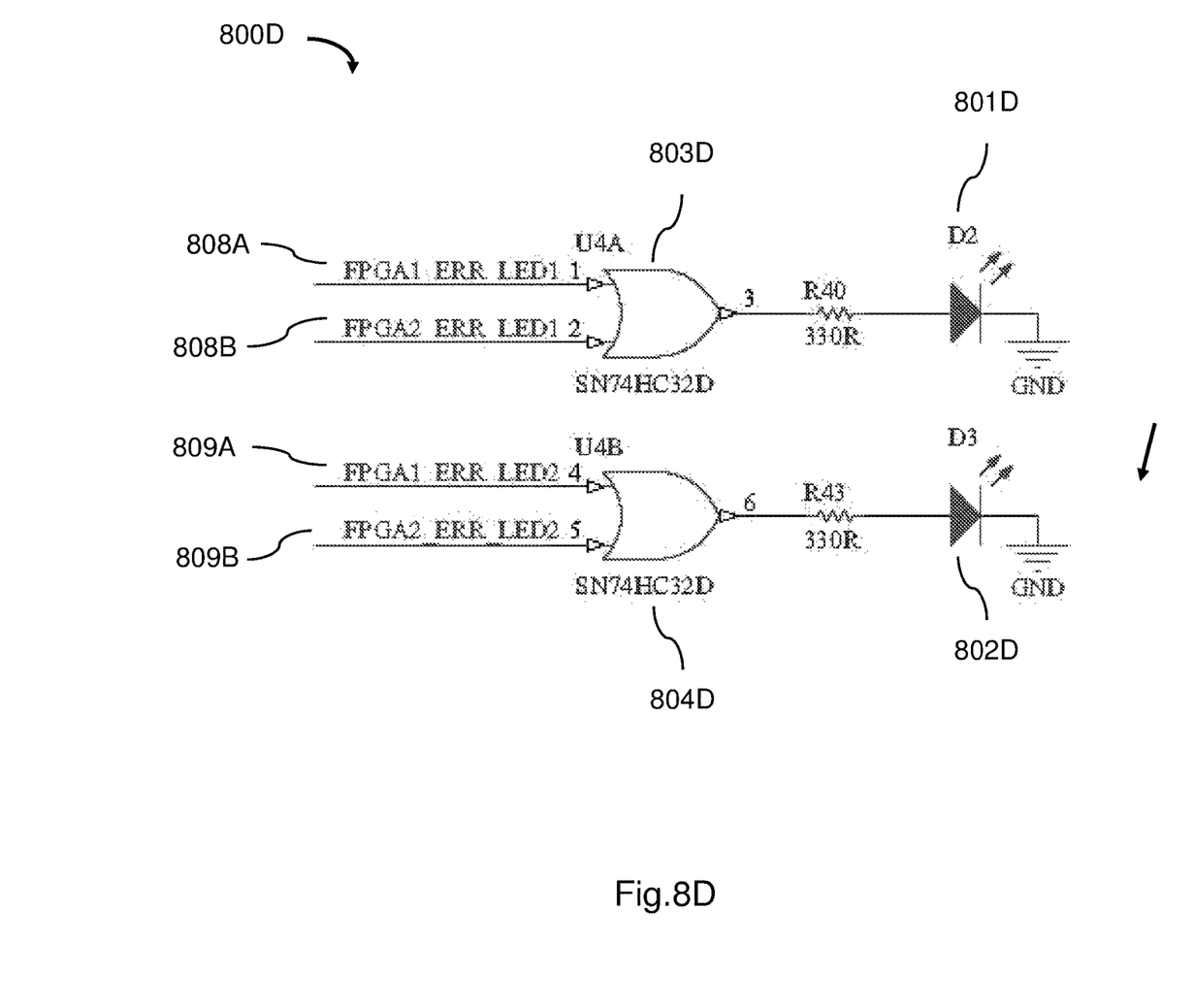
FIG. 8D shows a schematic illustration of a fourth part of the control system in accordance with the example embodiment in FIG. 8A.

FIG. 8A through FIG. 8D show a schematic illustration of a part of a control system with multiple outputs in accordance with an example embodiment. The control system includes two FPGA controllers as shown in FIG. 8A and FIG. 8B, and four microcontrollers that are connected with the FPGA controllers for control (not shown), 5 sets of opto-isolators as shown in FIG. 8C that are connected with the FPGA controllers, and circuits for error warning as shown in FIG. 8D. In FIG. 8A to FIG. 8D, the same signal label appearing in different figures means that they are electrically connected to each other.

By way of example, FIG. 8A and FIG. 8B show the two FPGA controllers 800A, 800B for the control system respectively. Each FPGA has its own clock, however, synchronization therebetween is achieved by a pair of communication signals through signal line 806A and 807A. The FPGA controller 800A provides a communication signal to FPGA controller 800B for synchronization through the signal line 806A and vice versa through signal line 807A. For example, when one FPGA controller completes the output of the PWM signal, it sends a "done" state signal as the communication signal to the other FPGA controller. Each FPGA controller generates a PWM signal after it receives the "done" state signal from the other FPGA controller, so that the two FPGA controller provides the PWM signals alternately.

By way of example, each FPGA controller provides 5 sequences of PWM signals 801A through 805A and 801B through 805B respectively. Besides, the FPGA controller 800A provides two error signals 808A and 809A. The FPGA controller 800B provides two error signals 808B and 809B.

FIG. 8C shows one set of opto-isolators 800C for isolating the input signals and output signals. The opto-isolators 800C includes two opto-isolators 801C and 802C. The opto-isolator 801C receives a PWM signal 810C from the FPGA controller 800A, and the opto-isolator 802C receives a PWM signal 820C from the FPGA controller 800B. For example, the signal 810C is the PWM signal 801A and the signal 820C is the signal 801B. The two signals 810C and 820C are combined together before coupling to the connector 803C. External wires (not shown) are connecting signals and power from the connectors 803C to a servo motor.

Since each FPGA controller provides five sequences of PWM signals, the signals are input into and isolated by 5 sets of opto-isolators 800C. Five servo motors can be controlled by the combined PWM signals output from the connector 803C.

FIG. 8D shows the warning circuit 800D for the control system. When MCUs error are detected in the FPGA controllers 800A and/or 800B, error signals 808A, 808B are send to the OR gate 803D and error signals 809A and 809B are sent to the OR gate 804D. The error signals 808A, 808B, 809A and 809B will trigger the LEDs 801D and 802D to light up with the OR gates. LED 801D is indicating three or more MCUs have failed and the system is in emergency landing state; whereas LED 802D is indicating two MCUs have failed.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein. For example, the example embodiments are related to actuators controlled by PWM signals, but other modes of modulating signals can also be adopted as part of the invention as long as the control signals can be synchronized by a clock signal and combined together to provide to the actuator. While he controllers described herein are FPGA controllers, those skilled in the art, based on the teaching of this invention, can realize the inventive ideas by other means; namely, discrete digital logic circuit or Application Specific Integrated Circuit (ASIC).

As used herein and in the claims, "couple" and "connect" refers to electrical couple and connection either directly or indirectly via one or more electrical means unless otherwise stated.

As used herein and in the claims, "synchronize" refers to two or more components to work in a coordinated timing.

As used herein and in the claims, "duty cycle" refers to the percentage of time when a signal is ON over the total time of a cycle.

As used herein and in the claims, "phase difference" refers to a difference expressed in degree between two signals having the same frequency and referenced to the same point in time, and one cycle constitutes 360° of phase.

As used herein and in the claims, "commutation signal" refers to a signal for control of the direction of motor rotation by switching the connections of the motor coils.

What is claimed is:

1. A control system for an actuator that is controlled by a pulse width modulation (PWM) signal, comprising:
   at least two controllers that are connected to the actuator; each of the controller sending an independent sequence of PWM signal to the actuator; and
   a sensor that is coupled to the actuator to measure a parameter of the actuator and to convert the parameter to an output signal, wherein the output signal is sent to the controllers to adjust the PWM signal of the controller;
   wherein the actuator is controlled by a combination of the PWM signals from all the controllers together;
   wherein the controllers are synchronized by a clock signal that provides a sequence of periodic clock interval;
   wherein the PWM signal from each controller occupies a separate and non-overlapping clock interval from the PWM signal of other controllers; and
   wherein the clock signal is generated by one of the controllers.

2. The control system in claim 1, wherein the functions and operations of the controllers are identical.

3. The control system in claim 1, wherein the clock signal is generated by a clock generator.

4. The control system in claim 1, wherein the parameter of the actuator is one of speed, position, torque and power.

5. The control system in claim 1, wherein the actuator is a DC motor.

6. An actuating system with improved reliability, comprising:
   a DC motor;
   at least two controllers that are connected with the DC motor; each of the controllers providing an independent sequence of PWM signal to the DC motor to actuate the DC motor; and
   a sensor that is coupled to the output of the DC motor and connected to the controllers, wherein the sensor senses a speed of the DC motor and converts the same to an output signal and sends the output signal to the controllers,
   wherein the controllers are synchronized by a clock signal that provides a sequence of periodic clock interval;
   wherein the PWM signal from each controller occupies a separate and non-overlapping clock interval from the PWM signal of other controllers, and
   wherein if one or more controller malfunction, the other controllers adjust the duty cycle of the PWM signals based on the output signal of the sensor, so that the speed of the DC motor is not affected by the malfunctioned controllers.

7. The actuating system in claim 6, wherein the function and operation of the controllers are identical.

8. The actuating system in claim 6, further comprising:
   an H-bridge that is connected between the controllers and the DC motor to reverse direction of the DC motor.

9. The actuating system in claim 6, wherein the clock signal is generated by one of the controllers.

10. The actuating system in claim 6, wherein the clock signal is generated by a clock generator.

11. The actuating system in claim 6, wherein the actuating system comprises two controllers; one controller uses a leading edge of the clock signal to trigger the generation of the PWM signal and the other controller uses a falling edge of the clock signal to trigger the generation of the PWM signal.

12. A method to improve the reliability of an actuating system that comprises an actuator and at least two controllers, each of the controller coupling to the actuator, comprising:
   generating, by a clock generator, a clock signal with a periodic clock interval to the controller;
   providing, by each controller, an independent sequence of PWM signal to the actuator; and
   actuating the actuator by a combination of the PWM signals from the controllers, wherein the PWM signal from each controller is synchronized by the clock signal and occupies a separate and non-overlapping clock interval from the PWM signal of other controllers, and
   wherein each controller operates independently from the others to provide redundancy to the actuating system; and
   wherein the controllers include a master controller and one or more slave controllers, and the clock signal is generated by the master controller, wherein the clock signal is generated by one of the slave controllers if the master controller malfunction.

13. The control method in claim 12, further comprising:
   measuring, by a sensor, an output parameter of the actuator;
   converting, by the sensor, the output parameter to an output signal;
   sending, by the sensor, the output signal to each controller; and
   adjusting, by the controllers, the duty cycle of the PWM signals according to the output signal.

14. The control method in claim 13, wherein the parameter of the actuator is one of speed, position, torque and power.

15. The control method in claim 12, wherein the actuating system comprises two controllers wherein a leading edge of the clock signal is used to trigger the generation of the PWM signal of the first controller and a falling edge of the clock signal is used to trigger the generation of the PWM signal of the second controller.

16. The control method in claim 12, wherein the controllers are identical in function and operation of and provide the PWM signals with the same duty cycle for the actuator.

* * * * *